(12) United States Patent
Sillador

(10) Patent No.: US 10,769,792 B2
(45) Date of Patent: Sep. 8, 2020

(54) IMAGE READING APPARATUS AND IMAGE FORMING APPARATUS COLLECTING IMAGE DATA OF A PLURALITY OF DOCUMENTS

(71) Applicant: KYOCERA Document Solutions Inc., Osaka (JP)

(72) Inventor: Jennybelle Sillador, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 16/587,559

(22) Filed: Sep. 30, 2019

(65) Prior Publication Data

US 2020/0118272 A1    Apr. 16, 2020

(30) Foreign Application Priority Data

Oct. 10, 2018    (JP) .................................. 2018-191957

(51) Int. Cl.
| | | |
|---|---|---|
| *H04N 1/32* | (2006.01) | |
| *G06T 7/11* | (2017.01) | |
| *H04N 1/203* | (2006.01) | |

(52) U.S. Cl.
CPC ............. *G06T 7/11* (2017.01); *H04N 1/2036* (2013.01); *H04N 1/3247* (2013.01); *H04N 1/32459* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,903,903 | A | 5/1999 | Kennedy | |
| 8,149,478 | B2 * | 4/2012 | Onishi | H04N 1/0035 |
| | | | | 358/488 |
| 9,179,035 | B2 * | 11/2015 | Kurilin | H04N 1/3873 |
| 2007/0182973 | A1 | 8/2007 | Godley | |
| 2008/0247005 | A1 * | 10/2008 | Marappan | H04N 1/38 |
| | | | | 358/497 |
| 2019/0132462 | A1 * | 5/2019 | Ogawa | H04N 1/00702 |
| 2019/0370539 | A1 * | 12/2019 | Shimamura | H04N 1/3873 |

FOREIGN PATENT DOCUMENTS

JP    2002-271605 A    9/2002

* cited by examiner

*Primary Examiner* — Barbara D Reinier
(74) *Attorney, Agent, or Firm* — IP Business Solutions, LLC

(57) ABSTRACT

An image reading apparatus includes a document reading device, an operation device, and a control device. The document reading device collectively reads a plurality of documents loaded on a document loading surface to generate image data. The control device functions as an individual image cutter, an operation receiver, and a generator. The individual image cutter cuts, from the image data generated by the document reading device, individual images independent for the respective documents. The operation receiver receives, via the operation device, a first instruction indicating a number of documents collected in one image. The generator generates document image data which is corresponding to an image of a size formable on a single recording medium and which has a collection of pieces of individual image data indicating the individual images, in unit of the number indicated by the first instruction.

6 Claims, 16 Drawing Sheets

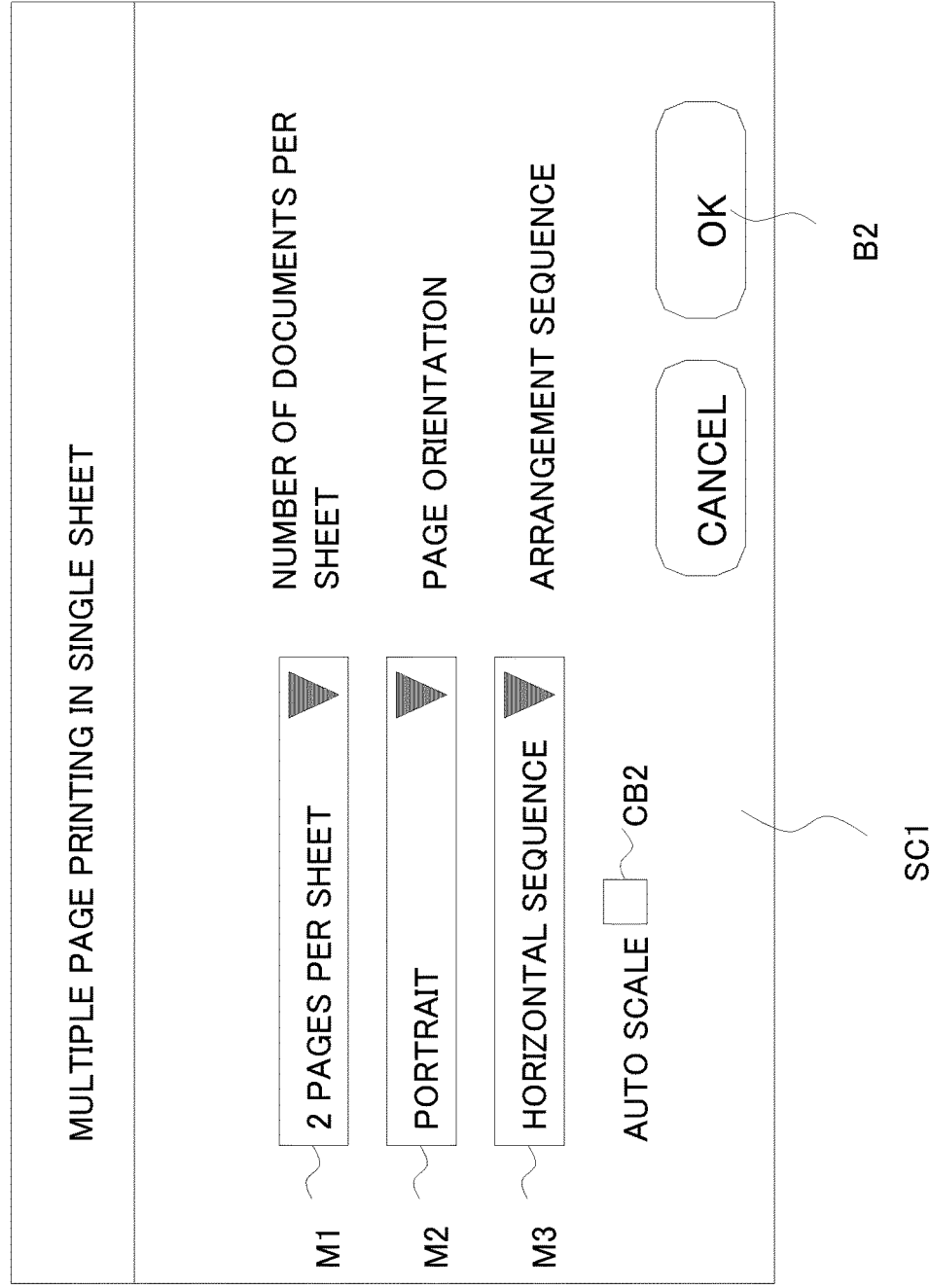

IMAGE READING APPARATUS AND IMAGE FORMING APPARATUS COLLECTING IMAGE DATA OF A PLURALITY OF DOCUMENTS

INCORPORATION BY REFERENCE

This application claims priority to Japanese Patent Application No. 2018-191957 filed on 10 Oct. 2018, the entire contents of which are incorporated by reference herein.

BACKGROUND

This disclosure relates to an image reading apparatus and an image forming apparatus and more specifically to a technology of processing image data of a plurality of documents which have been read at once.

Known is a technology of collecting images of a plurality of documents read at once in an image equivalent to a single sheet of recording paper and printing the plurality of documents on the single sheet of recording paper. For example, known is a technology of using an automatic document feeder (ADF) to collectively print a plurality of documents continuously read on a single sheet of recording paper. Also known is a technology of printing a plurality of web pages on a single sheet of recording paper. Further known is a technology by printing a plurality of pages of sentences on a single sheet of recording paper.

SUMMARY

A technology obtained by further improving the technology described above will be suggested as one aspect of this disclosure.

An image reading apparatus according to one aspect of this disclosure includes a document reading device, an operation device, and a control device. The document reading device collectively reads a plurality of documents loaded on a document loading surface to generate image data. The operation device receives input of an instruction from a user. The control device includes a processor and as a result of executing a correction control program by the processor, functions as an individual image cutter, an operation receiver, and a generator. The individual image cutter performs processing of cutting, from the image data generated by the document reading device, individual images independent for the respective documents. The operation receiver receives, via the operation device, a first instruction indicating a number of documents collected in one image. The generator generates document image data corresponding to an image of a size formable on a single recording medium, the document image data having a collection of pieces of individual image data indicating the individual images obtained through the cutting performed by the individual image cutter, in unit corresponding to the number indicated by the first instruction An image forming apparatus according to another aspect of this disclosure includes the image reading apparatus described above and an image forming device forming, on the recording medium, the image indicated by the document image data.

BRIEF DESCRIPTION OF THE DRAWINGS

FIG. 5 is a diagram illustrating one example of an operation screen displayed at a display device.

FIG. 7 is a diagram illustrating one example of an operation screen displayed at the display device.

DETAILED DESCRIPTION

Figure 1:
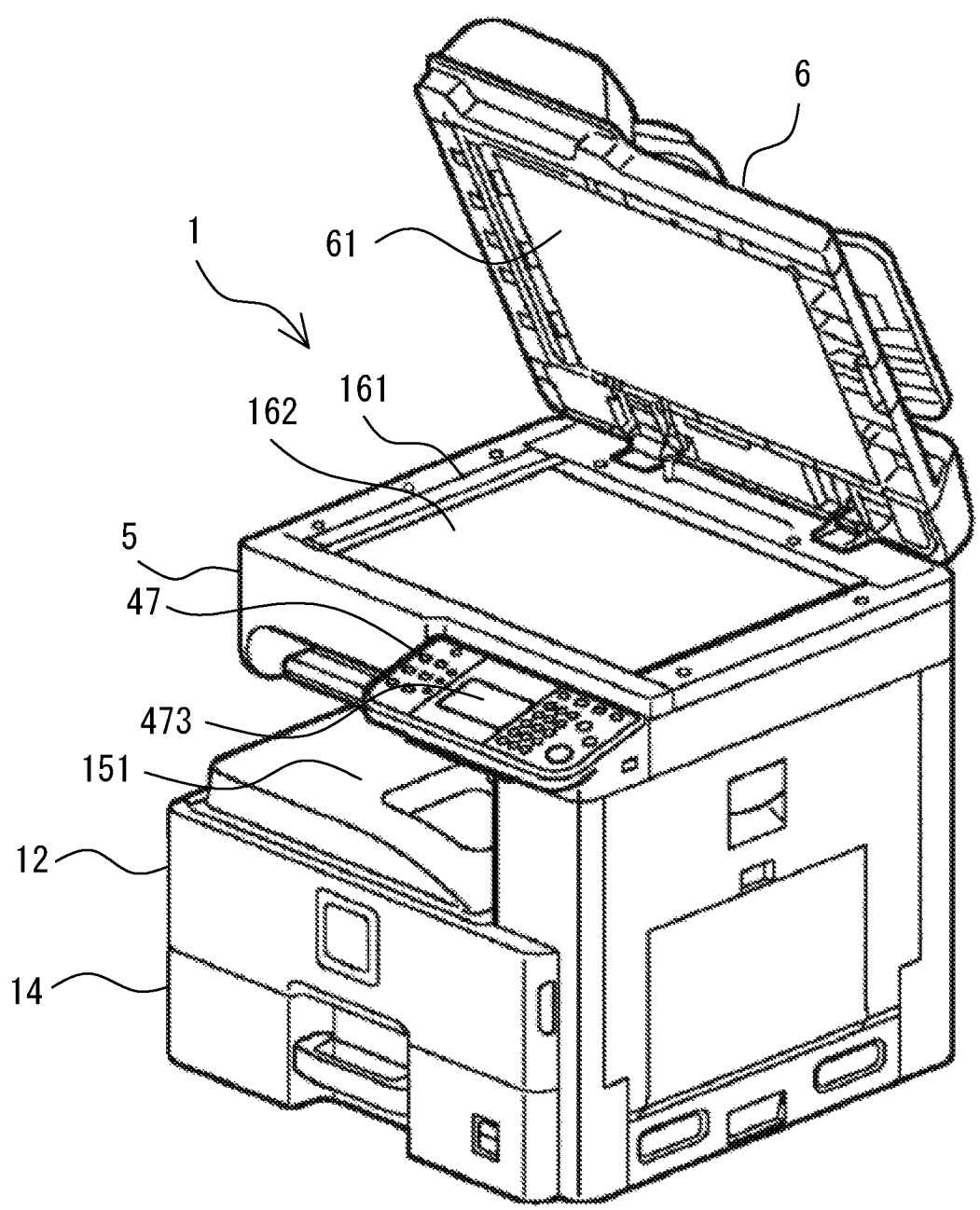
FIG. 1 is a perspective view illustrating outer appearance of an image forming apparatus according to one embodiment of this disclosure.
Figure 2:
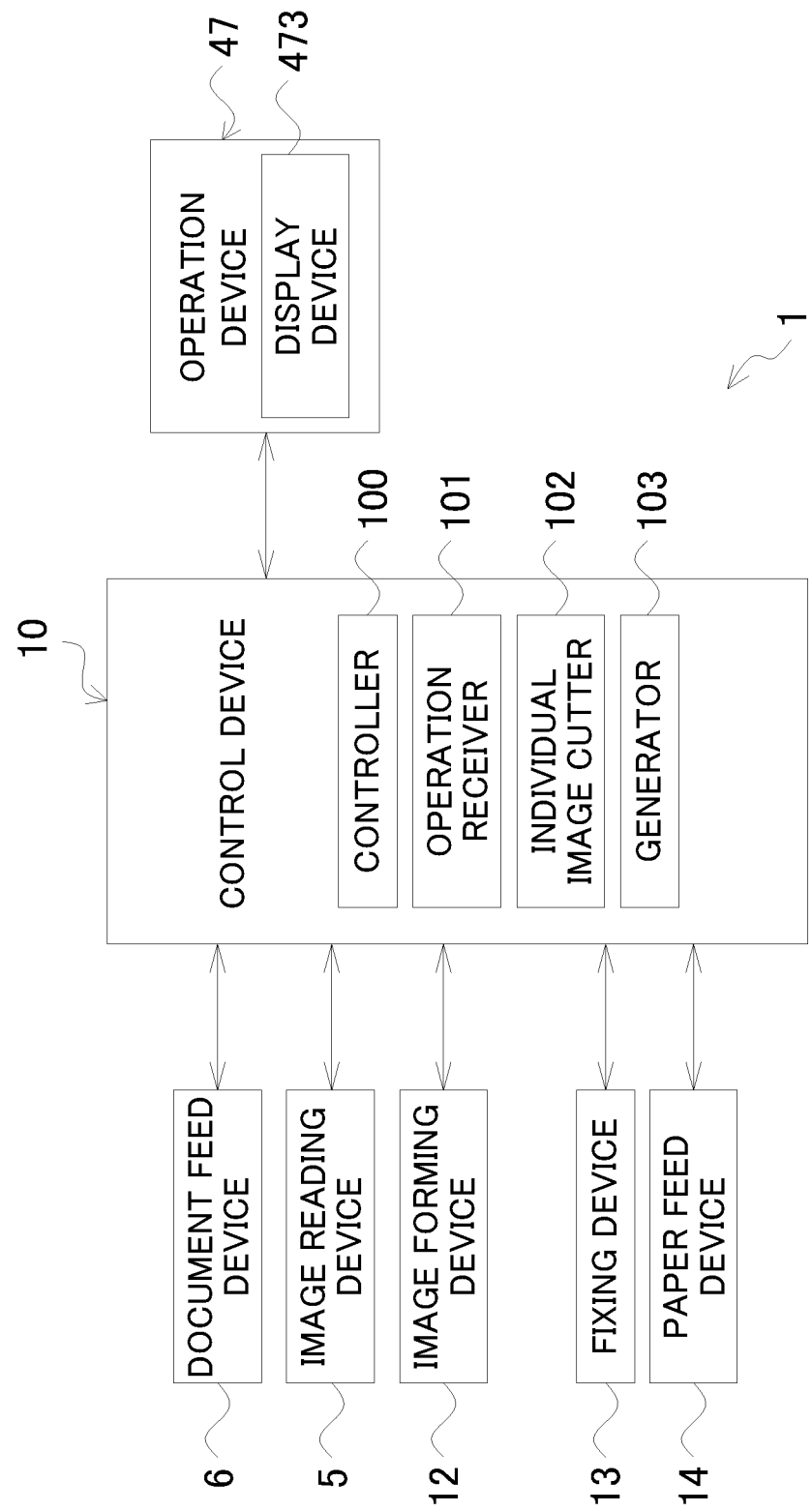
FIG. 2 is a functional block diagram schematically illustrating main inner configuration of the image forming apparatus according to one embodiment of this disclosure.

Hereinafter, an image reading apparatus and an image forming apparatus according to one embodiment of this disclosure will be described with reference to the drawings. FIG. 1 is a perspective view illustrating outer appearance of the image forming apparatus according to one embodiment of this disclosure. FIG. 2 is a functional block diagram schematically illustrating main inner configuration of the image forming apparatus according to one embodiment of this disclosure.

An image forming apparatus 1 is a multifunction peripheral including a combination of a plurality of functions such as, for example, a copy function, a printer function, a scan function, and a facsimile function. The image forming apparatus 1 includes a control device 10, a document feed device 6, a document reading device 5, an image forming device 12, a fixing device 13, a paper feed device 14, and an operation device 47.

A case where document reading operation is performed in the image forming apparatus 1 will be described. The document reading device 5 optically reads an image of a document conveyed by the document feed device 6 through conveyed-reading platen glass 161 or a document loaded on loaded-reading platen glass 162 to generate image data. The image data generated by the document reading device 5 is saved into an image memory or the like.

The document reading device 5 is configured to be capable of collectively reading a plurality of documents loaded on the loaded-reading platen glass 162. Note that the loaded-reading platen glass 162 is one example of a document loading surface in the scope of the claims.

The document feed device 6 is formed in an openable and closable manner over a top surface of the document reading device 5 with a hinge or the like in between. The document feed device 6 includes a document mat 61 and functions as a document press cover upon reading the document loaded on the loaded-reading platen glass 162.

A case where image formation operation is performed in the image forming apparatus 1 will be described. The image forming device 12 forms a toner image on recording paper as a recording medium fed from the paper feed device 14 based on document image data generated from, for example, the image data generated through the document reading operation or image data received from a network-connected external device (for example, personal computer).

The fixing device 13 heats or pressurizes the recording paper, on which the toner image has been formed by the image forming device 12, to fix the toner image on the recording paper through thermal compression. The recording paper subjected to the fixation processing is discharged onto a discharge tray 151. The paper feed device 14 includes a paper feed cassette.

The operation device 47 receives, from an operator, input of instructions such as an image formation operation execution instruction for various types of operation and processing executable by the image forming apparatus 1. The operation device 47 includes a display device 473 which displays, for example, an operation guide to the operator.

The display device 473 has a touch panel function, and the operator can touch buttons or keys displayed on the screen to operate the image forming apparatus 1.

The control device 10 includes a processor, a random access memory (RAM), a read only memory (ROM), and a dedicated hardware circuit. The processor is, for example, a central processing unit (CPU), an application specific integrated circuit (ASIC), or a micro processing unit (MPU).

Through operation performed by the processor in accordance with a control program stored in a hard disk drive (HDD) or the like, the control device 10 functions as a controller 100, an operation receiver 101, an individual image cutter 102, and a generator 103. Note that, however, the controller 100, etc. can be formed by a hardware circuit without depending on the operation performed in accordance with the control program by the control device 10. Hereinafter, the same applies to each embodiment unless otherwise is specified.

The controller 100 is in charge of overall operation control of the image forming apparatus 1. The controller 100 is connected to the document feed device 6, the document reading device 5, the image forming device 12, the fixing device 13, the paper feed device 14, and the operation device 47 and performs, for example, driving control of these devices.

The operation receiver 101 receives instructions inputted from a user via the operation device 47.

The individual image cutter 102 performs processing of cutting individual images independent for respective documents from the image data (hereinafter referred to as read image data) obtained through the reading performed by the document reading device 5. For example, the individual image cutter 102 executes known edge detection processing on the read image data to detect an edge. The individual image cutter 102 performs processing of cutting, as the individual image, a rectangular image with four sides surrounded by the edge as one bunch, from the read image data whose edge has been detected.

Figure 3:
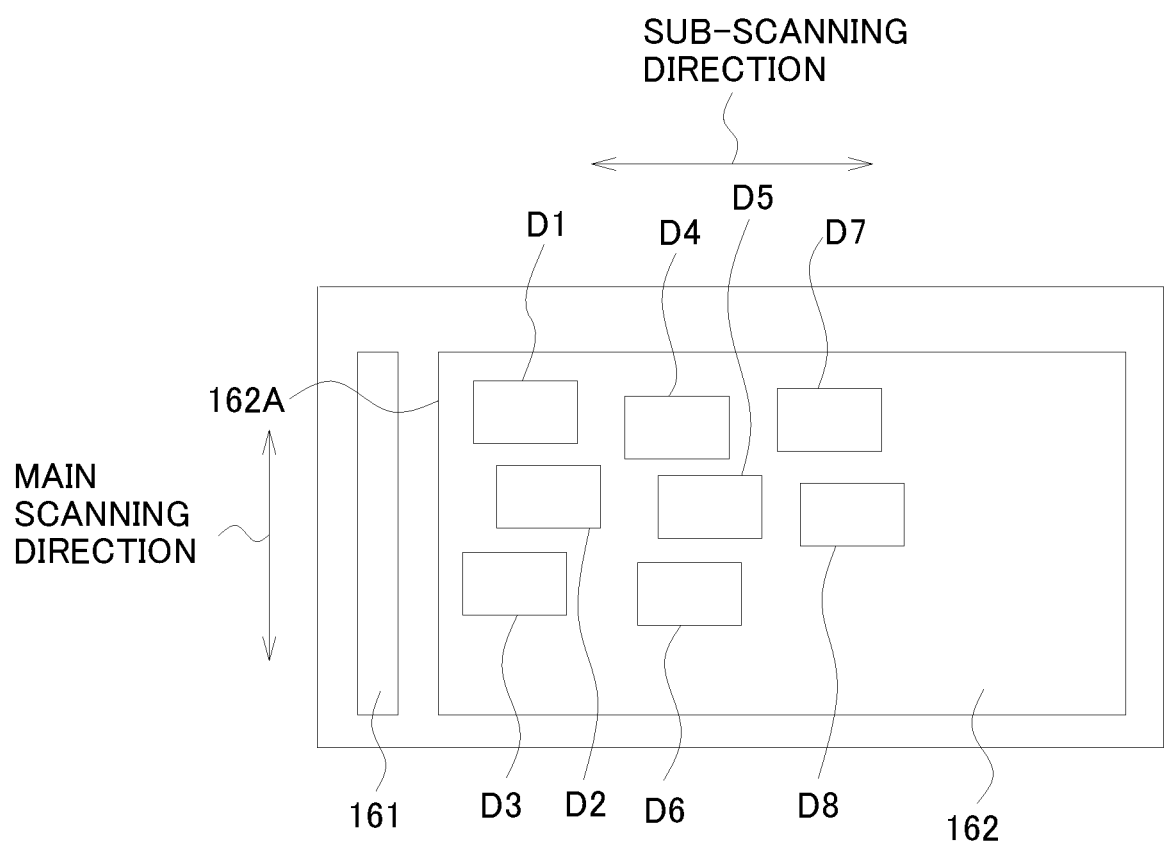
FIG. 3 is a diagram illustrating one example of a state in which a plurality of documents is loaded on loaded-reading platen glass, viewed from a top.

FIG. 3 illustrates one example of a state in which a plurality of documents is loaded on the loaded-reading platen glass 162. FIG. 3 is a diagram of the loaded-reading platen glass 162 viewed from a top, illustrating a state in which eight documents D1 to D8 (for example, name cards) are loaded on the loaded-reading platen glass 162.

Figure 4A:
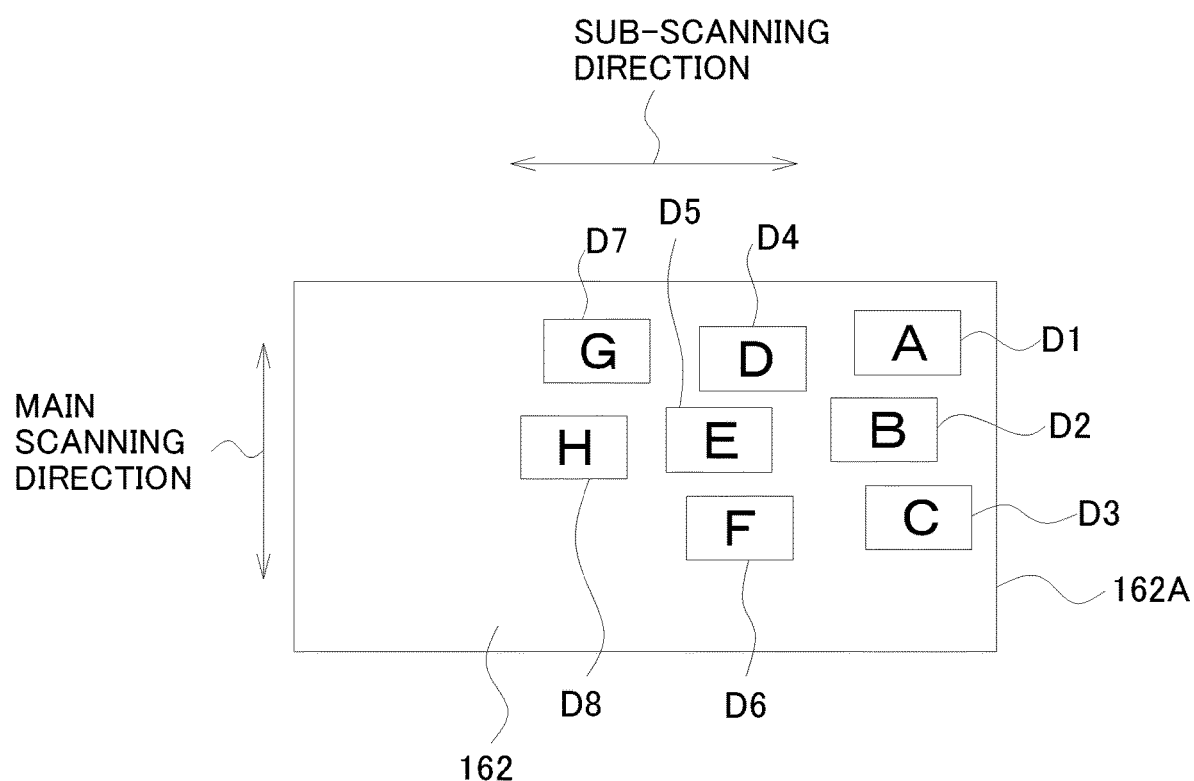
FIG. 4A is a diagram illustrating one example of a state in which the plurality of documents is loaded on the loaded-reading platen glass, viewed from a bottom.
Figure 4B:
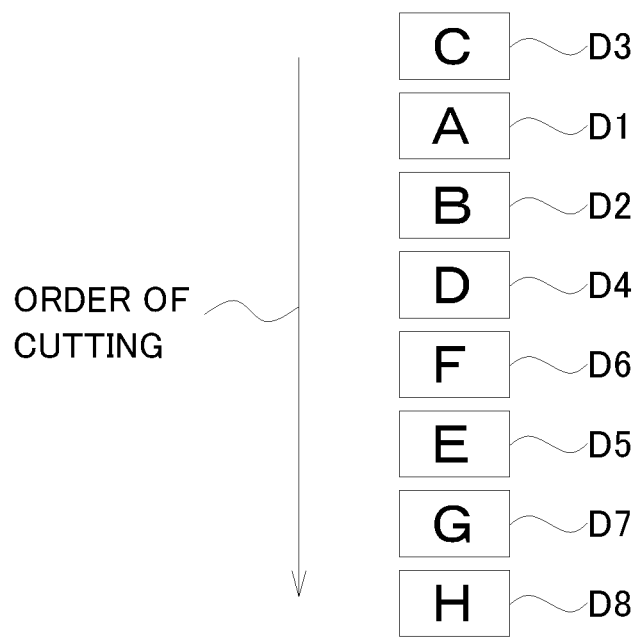
FIG. 4B is a diagram illustrating one example of order in which individual images indicated by the documents are cut.

FIG. 4A illustrates one example of a state in which a plurality of documents is loaded on the loaded-reading platen glass 162. FIG. 4A is a diagram of the loaded-reading platen glass 162 viewed from a bottom. That is, FIG. 4A is the diagram viewed from a direction opposite to a direction of FIG. 3 from which the loaded-reading platen glass 162 is viewed. FIG. 4B is a diagram illustrating one example of order in which individual images indicating the respective documents are cut. Note that FIGS. 4A and 4B illustrate an example in which the image indicating "A" is formed on the document D1, the image illustrating "B" is formed on the document D2, the image indicating "C" is formed on the document D3, the image indicating "D" is formed on the document D4, the image indicating "E" is formed on the document D5, the image indicating "F" is formed on the document D6, the image indicating "G" is formed on the document D7, and the image indicating "H" is formed on the document D8.

The individual image cutter 102 cuts the individual images (documents) included in the read image data in predefined order. For example, the individual image cutter 102 cuts the individual images on the read image data in order starting with the individual image which is to be read at a position located more closely to a document guide 162A in a sub-scanning direction. Thus, as illustrated in FIGS. 3 and 4A, in a case where the documents D1 to D8 have been read by the document reading device 5 after loaded on the loaded-reading platen glass 162, the individual image cutter 102 cuts, from the read image data, the eight individual images "A" to "H" indicating the documents D1 to D8 in order of the documents D3, D1, D2, D4, D6, D5, D7, and D8.

Specifically, the individual image cutter 102 first cuts the individual image which is written in "C", which indicates the document D3 and which is loaded most closely to the document guide 162A, then cuts the individual image which is written in "A" and which indicates the document D1, and finally cuts the individual image which is written in "H", which indicates the document D8, and which is loaded most distantly from the document guide 162A.

The generator 103 generates, for each number of sheets indicated by a first instruction received by the operation receiver 101, document image data including a collection of pieces of individual image indicating the individual images obtained through the cutting performed by the mechanical load 102. The document image data is image data corresponding to an image of a size formable on one sheet of recording paper. That is, upon generating document image data used for image formation on a plurality of sheets of recording paper, the generator 103 generates a plurality of pieces of document image data.

For example, the user inputs the first instruction for specifying the number of sheets described above via an operation screen SC1 (see FIG. 5) displayed at the display device 473 and the touch panel function of the display device 473. Upon performing predefined operation via the touch panel function to input, for example, an instruction for executing printing of a plurality of documents on a single sheet of recording paper by the user, the controller 100 causes the display device 473 to display the operation screen SC1 with a title name "Multiple Page Printing in Single Sheet" (Document Orientation), as illustrated in FIG. 5.

Formed on the operation screen SC1 are three pull down menus M1 to M3. Displayed on respective right sides of the pull-down menus M1 to M3 are: a character string "Number of Documents Per Sheet"; a character string "Page Orientation", and a character string "Arrangement Sequence".

Figure 6A:
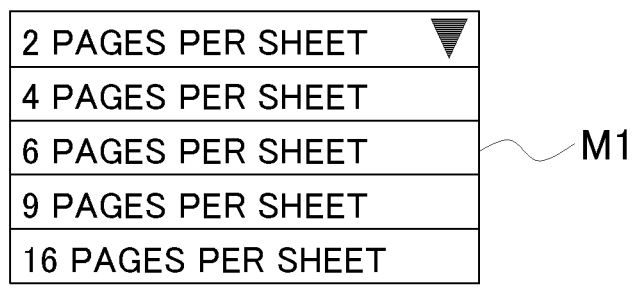
FIGS. 6A to 6C are diagrams each illustrating one example of contents of a pull-down menu.
Figure 6B:
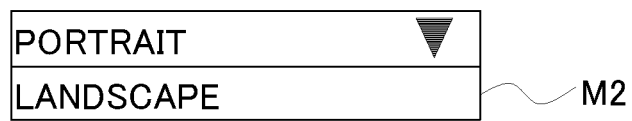
Figure 6C:
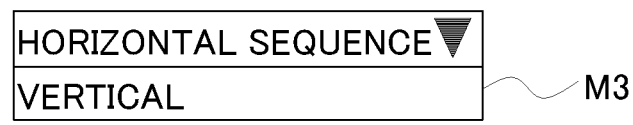

FIGS. 6A and 6C are diagrams illustrating contents of items in the respective pull-down menus M1 to M3. The pull-down menu M1 has items such as: "2 Pages Per Sheet (two documents are arranged on a single sheet of recording paper)" and "4 Pages Per Sheet (four documents are arranged on a single sheet of recording paper)", as illustrated in FIG. 6A. The pull-down menu M2 has items "Portrait (vertical document orientation)" and "Landscape (horizontal document orientation), as illustrated in FIG. 6B". The pull-down menu M3 has items "Horizontal Sequence (horizontal arrangement in sequence)" and "Vertical (vertical arrangement in sequence)", as illustrated in FIG. 6C.

Upon selecting preferred one of the items from each of the pull-down menus M1 to M3 to specify a desired print layout through the touch panel function by the user, the operation receiver 101 receives the specification of the print layout.

Displayed on the operation screen SC1 (FIG. 5) is a check box CB2. A character string "Auto Scale" is displayed besides the check box CB2. Further, a select button B2 written with "OK" is displayed on the operation screen SC1.

For example, as illustrated in FIG. 7, under condition that the item "4 Pages Per Sheet (four documents are arranged on a single sheet of recording paper) has been selected on the pull-down menu M1 (the first instruction), the item "Landscape (horizontal document orientation)" has been selected on the pull-down menu M2 (a second instruction), and the item "Horizontal Sequence" has been selected on the pull-down menu M3 (a third instruction), and the operation receiver 101 has received the print layout provided through these selections, the generator 103 generates the document image data as described below.

Figure 8A:
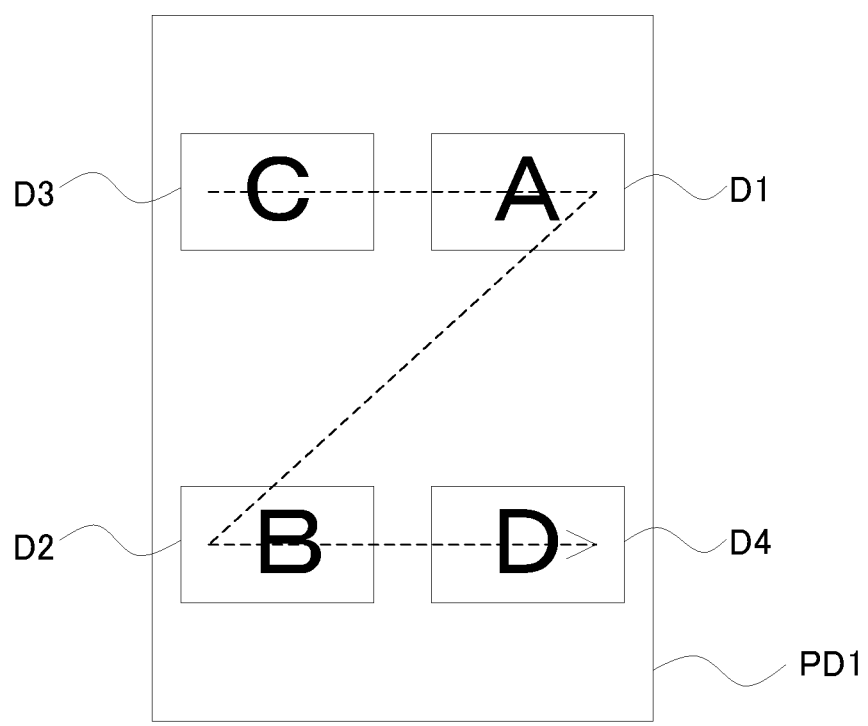
FIGS. 8A and 8B are diagrams each illustrating one example of document image data generated by arraying a plurality of pieces of individual image data.
Figure 8B:
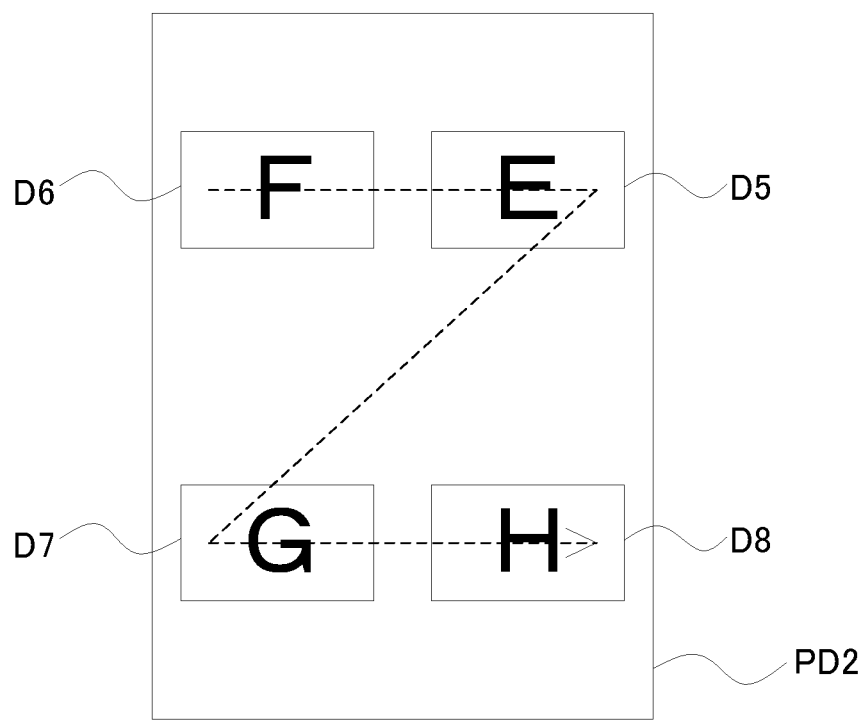

For example, as illustrated in FIG. 4B, in a case where the individual image cutter 102 cuts the individual images indicating the documents D1 to D8 in order of the documents D3, D1, D2, D4, D6, D5, D7, and D8, in a manner such that the document orientation is landscape as illustrated in FIGS. 8A and 8B and the documents are arrayed rightward from a left top (a predefined reference position) in FIGS. 8A and 8B under the aforementioned condition, the generator 103 arrays the pieces of individual image data of the individual images respectively indicating the documents D1 to D8 in order of the documents D3, D1, D2, and D4 to generate first document image data PD1 and in order of D6, D5, D7, and D8 to generate second document image data PD2.

Upon arrival at the individual image data at a right end, the generator 103 arrays the pieces of individual image data rightward from a left bottom, as illustrated in FIGS. 8A and 8B. Therefore, in order to form a flow of a visual line into a "Z" shape as illustrated in FIGS. 8A and 8B, the generator 103 arrays the pieces of individual image data in order of the documents D3, D1, D2, and D4 to generate the first document image data PD1 and arrays the pieces of individual image data in order of the documents D6, D5, D7, and D9 to generate the second document image data PD2.

Figure 9:
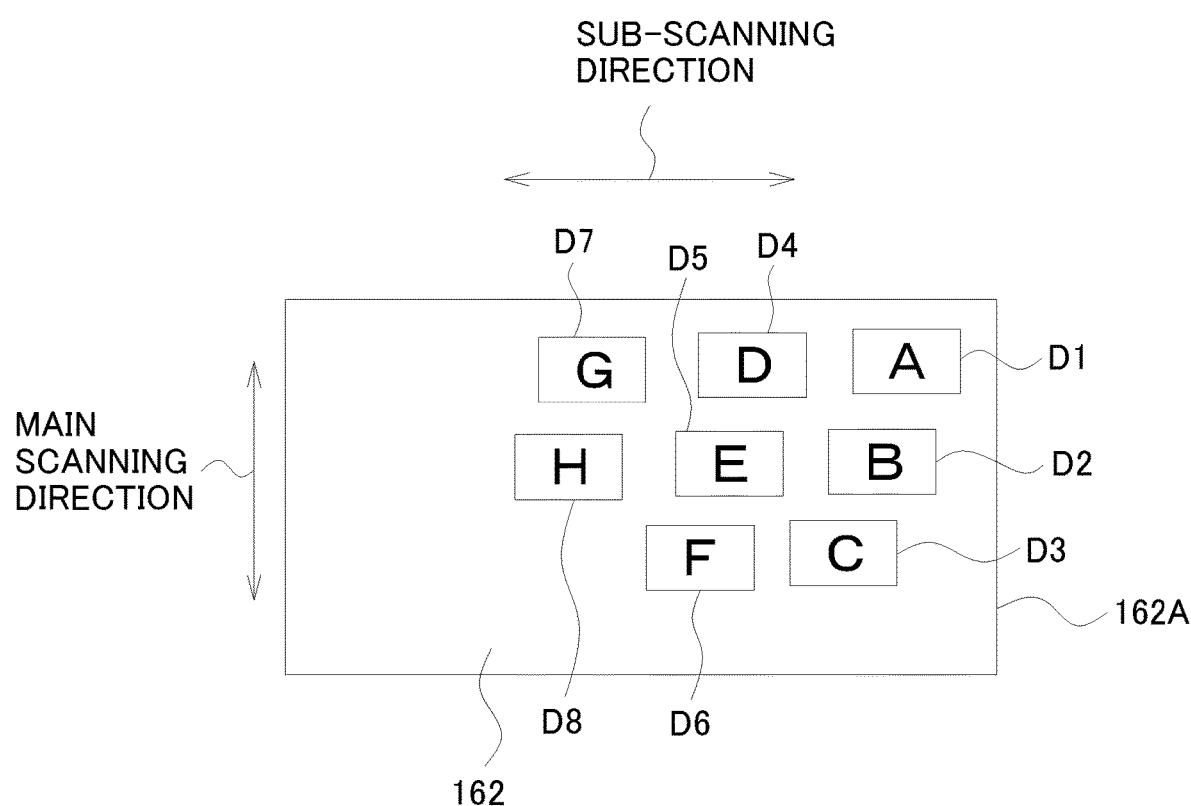
FIG. 9 is a diagram illustrating another example of the state in which the plurality of documents is loaded on the loaded-reading platen glass, viewed from the bottom.

Note that if the user desires to specify the order in which each of the documents D1 to D8 is arrayed, as illustrated in FIG. 9, upon loading the documents D1 to D8 on the loaded-reading platen glass 162, for example, of the documents D1 to D8, the document D1 to be arrayed at the beginning is arranged at a position closest to the document guide 162A in the sub-scanning direction and the documents D2 to D8 to be arrayed the next are loaded at positions in order with a gradual increase in a distance from the document guide 162A in the sub-scanning direction.

Figure 10A:
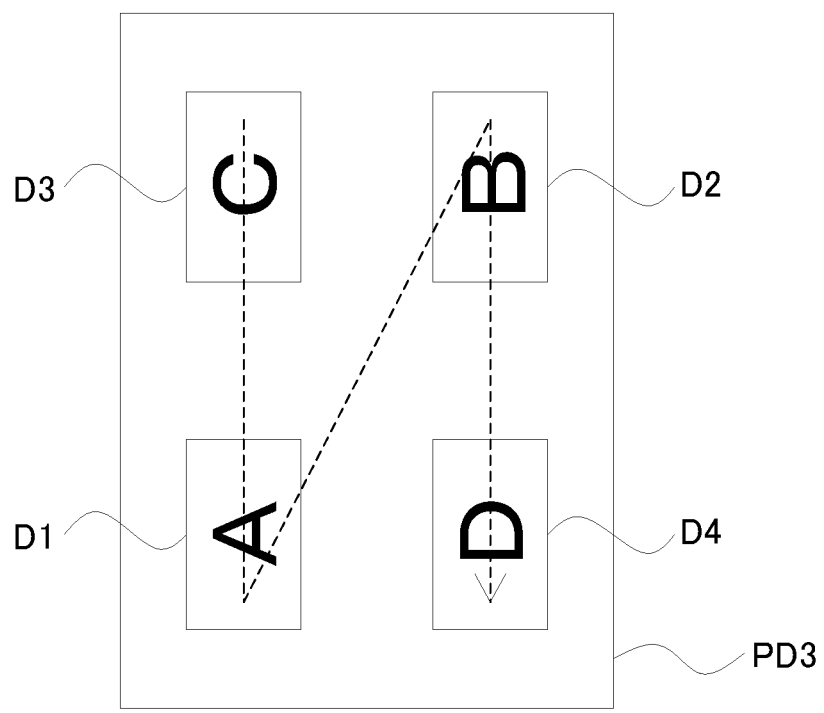
FIGS. 10A and 10B are diagrams each illustrating another example of document image data generated by arraying the plurality of pieces of individual image data.
Figure 10B:
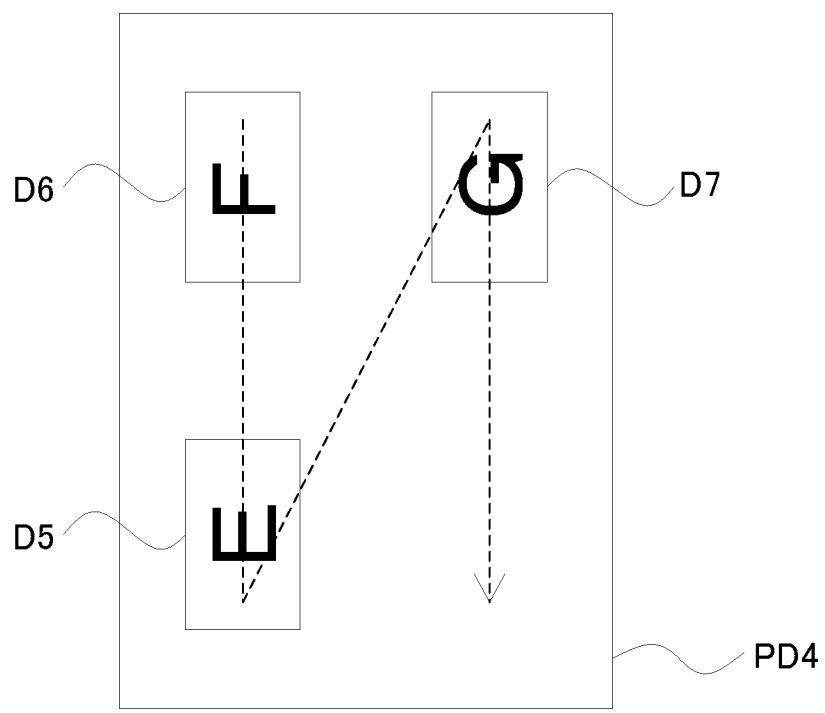

On the other hand, in a case where the individual image cutter 102 has cut the individual images indicating the seven documents D1 to D7 in order of the documents D3, D1, D2, D4, D6, D5, and D7 in a state in which the item "4 Pages Per Sheet (four documents are arranged on a single sheet of recording paper) has been selected on the pull-down menu M1 (the first instruction), the item "Portrait (vertical document orientation)" has been selected on the pull-down menu M2 (the second instruction), and the item "Vertical" has been selected on the pull-down menu M3 (the third instruction), the generator 103 generates document image data PD3 and PD4 illustrated in FIGS. 10A and 10B.

Specifically, in a case where the item "Vertical" has been selected on the pull-down menu M3, the generator 103 arrays the pieces of individual image data of the individual images indicating the documents D1 to D7 downward (vertically) from a left top (a reference position) as illustrated in FIGS. 10A and 10B. That is, the pieces of individual image data are arrayed in a manner such that a flow of a visual line is shaped into an inverted-N shape.

Upon arrival at the individual image data at a left bottom, the generator 103 then arrays the pieces of individual image data downward from a right top in FIGS. 10A and 10B. Therefore, in order to form the flow of the visual line into the "inverted-N" shape as illustrated in FIGS. 10A and 10B, the generator 103 arrays the pieces of individual image data in order of the documents D3, D1, D2, and D4 to generate the document image data PD3 and arrays the pieces of individual image data in order of the documents D6, D5, and D7 to generate the document image data PD4.

However, upon generating the document image data in order to print the plurality of documents on the single sheet of recording paper, the arrangement of the pieces of individual image data while the document size is unchanged as described above may result in failure to make the pieces of individual image data fall within document image data of a size corresponding to a size formable on the single sheet of recording paper. The aforementioned problem occurs, for example, in a case where the number of pieces of individual image data to be collected in a single document image data is large. In this case, reducing the size of the piece of individual image data can solve the aforementioned problem. Thus, in a case where the operation receiver 101 has received an instruction for the image reduction as a result of operating the check box CB2 to input the image reduction instruction by the user, the generator 103 performs image processing of reducing the size of each piece of individual image data in order to make all the pieces of individual image data to be collected within an image of the size formable on the single sheet of recording paper.

Figure 11:
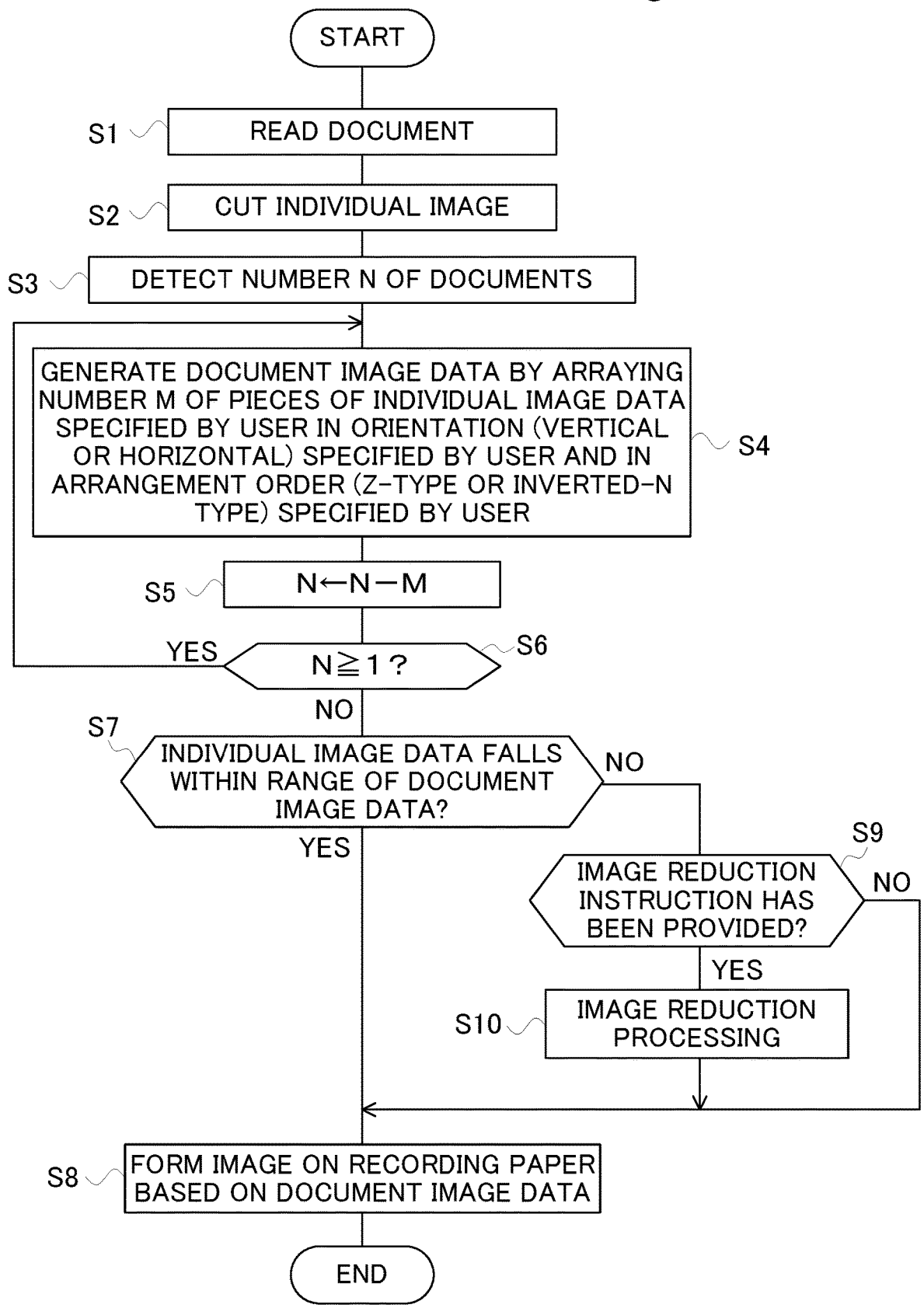
FIG. 11 is a flowchart illustrating one example of processing performed in a control device in the image forming apparatus according to one embodiment.

Next, one example of processing performed in the control device 10 of the image forming apparatus 1 according to one embodiment will be described based on a flowchart illustrated in FIG. 11. Note that this processing is performed, for example, upon reception of an instruction for executing copy operation through user's operation of the operation device 47 by the operation receiver 101.

Upon receiving the instruction for executing the copy operation by the operation receiver 101, the controller 100 causes the document reading device 5 to read the documents loaded on the loaded-reading platen glass 162 and causes, for example, the image memory built in the control device 10 to store the read image data obtained through the reading performed by the document reading device 5 (step S1).

Then the individual image cutter 102 performs processing of cutting, from the read image data, the individual images independent for the respective documents (step S2), and stores, into the image memory, the pieces of individual image data indicating the respective cut individual images.

Subsequently, the generator 103 detects, based on a result of cutting the individual images by the individual image cutter 102, a document number N (that is, a number N of pieces of individual image data obtained through the cutting described above) (step S3).

Then the generator 103 generates the document image data by collectively arraying the pieces of individual image data obtained through the cutting performed by the individual image cutter 102 in the order of cutting as well as in a number M of documents arranged on the single sheet of recording paper (that is, a number M of documents arranged in the document image data corresponding to the image of the size formable on the single sheet of recording paper) and in the document orientation (vertical or horizontal) and the arrangement sequence (the Z-type or the inverted-N type) (step S S4), all of which have been specified by the user through the operation performed on the operation screen SC1. The generator 103 performs the generation processing by use of the piece of individual image data of a size unchanged from that of the pieces of individual image data used upon the reading performed in step S1.

Further, the generator 103 subtracts the number M specified by the user from the number N (step S5) and determines whether or not the number N obtained after the subtraction is equal to or greater than 1 (step S6). Upon determining that the number N is equal to or greater than 1 (YES in step S6), the generator 103 returns to step S4 since the individual image (document) to be printed remains to further generate document image data.

At this point, the number N obtained by subtracting the number M specified by the user from the number N may become smaller than the number M specified by the user. Specifically, when the generator 103 has collected the pieces of individual image data in units of the number M indicated by the instruction received by the operation receiver 101, the number of pieces of individual image data to be arranged may be less than the number M indicated by the aforementioned instruction. In this case, the generator 103 generates the document image data obtained by collecting a number of pieces of individual image data which is less than the number M indicated by the instruction.

On the other hand, upon determining by the generator 103 that the number N is not equal to or greater than 1 (No in step S6), no individual image (document) to be printed remains and thus the generator 103 ends the processing of collecting the pieces of individual image data, proceeding to the processing in step S7. The generator 103 determines whether or not each piece of individual image data arranged in step S4 falls within a range of the document image data (within the range of the image of the size formable on the single sheet of recording paper) (step S7).

Upon determining by the generator 103 that each piece of individual image data arranged in step S4 falls within the range of the document image data (YES in step S7), the controller 100 controls operation of the image forming device 12, causing formation of the image on the recording paper based on each piece of individual image data generated by the generator 103 (step S8). Then the processing ends.

On the other hand, upon determining by the generator 103 that each piece of individual image data arranged in step S4 does not fall within the range of the document image data (NO in step S7), it is determined whether or not the operation receiver 101 has received the image reduction instruction (step S9).

Upon determining that the image reduction instruction has been received by the operation receiver 101, the generator 103 performs image reduction processing on each piece of individual image data in a manner such that the specified number M of pieces of individual image data fall within the range of the document image data (step S10). Then the processing proceeds to image formation processing (step S8).

On the other hand, upon determining that the image reduction instruction has not been received by the operation receiver 101 (NO in step S9), the generator 103 does not perform the image reduction processing. In a case where the specified number M of pieces of individual image data do not fall within the range of the document image data as described above, the generator 103 cuts, from the image obtained through synthesizing the specified number M of pieces of individual image data, an image portion located within the range of the document image data to generate the cut image portion as document image data. Then the processing proceeds to the image formation processing (step S8).

Note that processing up to the image formation performed on the recording paper based on the document image data (step S8) is executed in the embodiment described above, but even performing the aforementioned processing of generating the document image data obtained by reading a plurality of documents and collecting the number M of pieces of individual image data indicated by the instruction received by the operation receiver 101 can form an embodiment of this disclosure.

Moreover, the generator 103 generate the document image data by arranging each piece of individual image data in predefined arrangement order in the order of the cutting performed by the individual image cutter 102 in the embodiment described above, but regardless of the order in which the cutting is performed by the individual image cutter 102, the generator 103 may generate the document image data by arranging each piece of individual image data in the predefined arrangement order in order starting with the individual image included in the read image data and located at a position closely to the document guide 162A in the sub-scanning direction in the document image data generation.

However, the user may desire to print, on a single sheet of recording paper, a collection of a plurality of small-sized documents (documents, for example, name cards of a size plurally loadable on platen glass of a copier). For example, to print a collection of four name cards on the single sheet of recording paper, the user performs operation of loading the four name cards on the platen glass of the copier and then pressing a copy execution start button.

For example, to print eight name cards, four each, separately on two sheets of recording paper, the user repeats the aforementioned operation twice. Moreover, to print the eight name cards, two each, separately on four sheets of recording paper, the user repeats the aforementioned operation four times. That is, to print a plurality of documents on two or more sheets of recording paper, the user is required to repeatedly perform the same operation, which requires time and efforts from the user. Moreover, a technology of printing, on a single sheet of recording paper, a collection of small-sized documents in units of the number of documents desired by the user is generally not well-known.

On the contrary, according to the embodiment described above, it is possible to create document image data, corresponding to an image of a size formable on a single sheet of recording paper, by collecting pieces of image data of the plurality of documents read at once in units of a number of pieces specified by the user without imposing great load on the operation performed by the user. For example, it is possible to create two pieces of document image data by collecting the eight documents, four each, loaded on the document loading surface.

Consequently, for example, the frequency of conventionally and repeatedly performed operation of replacing the documents on the loaded-reading platen glass 162 (document loading surface) upon reading a plurality of documents in units of the number of documents desired by the user, can be reduced, which can reduce the time and efforts from the user. Moreover, the user can also specify the document orientation and the document arrangement sequence, thus making it possible to perform the aforementioned collection and then perform printing in a print layout desired by the user.

This disclosure is not limited to the configuration of the embodiment described above and various modifications can be made to this disclosure. The embodiment has been described above, referring to the multifunction peripheral as one embodiment of the image forming apparatus according to this disclosure, but this is only one example and any other image forming apparatus having, for example, a copy function, a scan function, etc. may be used.

Moreover, in the embodiment described above, the image forming device 12 or the like forms an image on recording paper, but this disclosure is not limited to such an embodiment. The image forming device 12 or the like may form an image on not only recording paper but also another recording medium. Examples of another recording medium include an overhead projector (OHP) sheet.

Moreover, in the embodiment described above, the aforementioned configurations and processing illustrated by the embodiment described above with reference to FIGS. 1 to 11 form just one embodiment and this disclosure is not limited to these configurations and processing.

While the present disclosure has been described in detail with reference to the embodiments thereof, it would be apparent to those skilled in the art the various changes and modifications may be made therein within the scope defined by the appended claims.

What is claimed is:

1. An image reading apparatus comprising:
   a document reading device collectively reading a plurality of documents loaded on a document loading surface to generate image data;
   an operation device receiving input of an instruction from a user; and
   a control device including a processor and as a result of executing a correction control program by the processor, functioning as:
   an individual image cutter performing processing of cutting, from the image data generated by the document reading device, individual images independent for the respective documents;
   an operation receiver receiving, via the operation device, a first instruction indicating a number of documents collected in one image; and
   a generator generating document image data corresponding to an image of a size formable on a single recording medium, the document image data having a collection of pieces of individual image data indicating the individual images obtained through the cutting performed by the individual image cutter in unit corresponding to the number indicated by the first instruction.

2. The image reading apparatus according to claim 1, wherein
   upon collecting the pieces of individual image data in the unit corresponding to the number indicated by the first instruction, in a case where a number of pieces of the individual image data is less than the number indicated by the first instruction, the generator generates the document image data having a collection of the number of pieces of individual image data which is less than the number indicated by the first instruction.

3. The image reading apparatus according to claim 1, wherein
   the operation receiver further receives, via the operation device, a second instruction indicating orientation of the document in the image indicated by the document image data, and
   the generator arranges the pieces of individual image data in accordance with the orientation of the document indicated by the second instruction to generate the document image data.

4. The image reading apparatus according to claim 1, wherein
   the operation receiver further receives, via the operation device, a third instruction indicating an arrangement sequence of the document in the image indicated by the document image data, and
   the generator arranges the pieces of individual image data in accordance with the arrangement sequence of the document indicated by the third instruction to generate the document image data.

5. The image reading device according to claim 1, wherein
   in a case where each piece of the collected individual image data does not fall within a range of the image of the size formable on the single recording medium and a reduction instruction for reducing sizes of the pieces of individual image data has been received by the operation receiver via the operation device, the generator reduces the sizes of the respective pieces of individual image data in a manner such that the number of pieces of individual image data corresponding to the number indicated by the first instruction fall within the range of the image of the size formable on the single recording medium, and
   in a case where each piece of the collected individual image data does not fall within the range of the image of the size formable on the single recording medium and the image reduction instruction has not been received by the operation receiver, the generator cuts an image portion within the range of the image of the size formable on the single recording medium from an image obtained by synthesizing the number of pieces of individual image data corresponding to the number indicated by the first instruction and generates, as the document image data, the image portion being cut.

6. An image forming apparatus comprising:
   the image reading apparatus according to claim 1; and
   an image forming device forming, on the recording medium, the image indicated by the document image data.

* * * * *